United States Patent [19]

Smith

[11] Patent Number: 5,555,673

[45] Date of Patent: Sep. 17, 1996

[54] METHOD AND APPARATUS FOR APPLYING LIQUID

[76] Inventor: Wayne H. Smith, R.R. 2 Box 81, Leoti, Kans. 67861

[21] Appl. No.: 337,729

[22] Filed: Nov. 14, 1994

[51] Int. Cl.$^6$ .................................................. A01M 21/04
[52] U.S. Cl. ............................ 47/1.5; 401/206; 401/272; 118/270
[58] Field of Search ............................... 47/1.5; 401/148, 401/206, 272; 118/264, 270

[56] References Cited

U.S. PATENT DOCUMENTS

| | | | |
|---|---|---|---|
| 1,606,860 | 11/1926 | Winn | 47/1.5 |
| 2,979,757 | 4/1961 | Smith | 47/1.5 |
| 3,552,870 | 1/1971 | Brooks | 401/272 |
| 5,216,833 | 6/1993 | Longer | 47/1.5 |

FOREIGN PATENT DOCUMENTS

| | | | |
|---|---|---|---|
| 504612 | 7/1951 | Belgium | 401/206 |
| 2120915 | 12/1983 | United Kingdom | 47/1.5 |

*Primary Examiner*—Henry E. Raduazo

*Attorney, Agent, or Firm*—John W. Carpenter

[57] ABSTRACT

A generally cylindrical body is adapted to holding a liquid, such as water, herbicide, pesticide, or the like, and has a cap removably secured thereto for removing and disposing the liquid therein. Another generally cylindrical dispensing body is adapted to slidably fit over the end of the body opposite the cap. The dispensing body has a top with holes disposed therein wherethrough the liquid may be passed. Another generally cylindrical cap body has a top formed of a cellulosic material which is adapted to absorbing liquids such as water, pesticide, etc, and a valve assembly is situated in the end of the body opposite the cap for gravitatively passing liquid therethrough when the valve release is depressed. The valve release member is depressed by the action of the dispensing body sliding towards the cylindrical body and pressing the valve release. A spring maintains spring bias against the body to prevent the valve release from being continually pressed or opened. When the valve is depressed or open, liquid gravitatively flows through the valve, through the holes and into the cellulosic material. The cellulosic material holds the liquid until saturated or until the cellulosic material is compressed to force the liquid therefrom and onto a surface or object.

3 Claims, 7 Drawing Sheets

METHOD AND APPARATUS FOR APPLYING LIQUID

FIELD OF THE INVENTION

The present invention is related to an apparatus and method for applying a liquid; more specifically, the present invention is related to an apparatus for containing a quantity of liquid and gravitatively selectably releasing a portion of the liquid through a valve into a cellulosic material for application to an object or surface.

BACKGROUND OF THE INVENTION

A patentability search was conducted and the following U.S. Patents were found: U.S. Pat. No. 4,276,718 to Keeten et al; U.S. Pat. No. 4,486,976 to Samuelsson; U.S. Pat. No. 4,597,219 to Kropf; U.S. Pat. No. 4,608,045 to Fretwell; U.S. Pat. No. 4,747,720 to Bellehumeur; U.S. Pat. No. 4,882,874 to Paulson et al; U.S. Pat. No. 4,902,155 to Buschemeyer; and U.S. Pat. No. 5,216,833 to Longer.

The U.S. Pat. No. 4,276,718 to Keeten et al teaches a liquid applicator device and a method of utilization thereof to effect plant destruction. A first distinct container containing herbicide, with a rotary valve extending from one end thereof, is mounted on a second elongated container with the metering valve between the first and second containers. An elongated roller having a fibrous cover for receiving herbicide from the container and for ultimately transferring the herbicide to a plant is insertable into the second container, and has a handle extending from one end thereof outwardly of the second container. The opposite end of the roller is operatively connected to an actuator for the valve between the containers so that relative rotational movement between the roller and the containers results in metering of a predetermined amount of herbicide from the first container to the second container. In the second container the herbicide is evenly distributed over the surface of the fibrous covering, and after the predetermined amount has been metered the roller is withdrawn and the fibrous covering thereof touched to plants to effect destruction thereof. A telescopic rod operatively connects the roller handle to a support for the fibrous covering.

The U.S. Pat. No. 4,486,976 to Samuelsson discloses an assembly for contact killing of weeds by coating the weeds with liquid killer comprising: an elongated, finger or band shaped, resiliently yielding supporting body, for instance in the from of a spring wire, a prestressed closely wound helical spring or a resilient tube; a capillary carrier for the killer, for instance in the form of a porous socket or a wick means the killer; and a fastening means supporting the assembly and positioned at least at one end of the assembly. The assembly can be supported in a direction deviating from the vertical direction.

The U.S. Pat. No. 4,597,219 to Kropf teaches a vacuum gravity feed contact herbicide applicator including a wicking head and an elevated container for gravity feeding herbicide liquid via an internal generally vertical conduit into the head. The container and conduit are sealed to maintain a partial vacuum. The wicking head is structured so that the liquid rises in a generally vertical internal passageway to a level limit by the partial vacuum such that the liquid does not overflow from an outlet opening of the passageway in an upper side of the wicking head. A first wicking material is disposed in the passageway for drawing the liquid upward through the outlet opening for transfer to a second wicking material surrounding the wicking head and covering the outlet opening. The wicking material is non-woven fibrous rayon fabric material impervious to air when saturated but pervious when unsaturated, to control passage of air into the wicking head an spillage of liquid from same. The conduit and passageway communicate through a single internal opening constricted so that liquid and air interferingly counterflow therethrough to regulate the flow of air back into the container and thereby the flow of liquid into the wicking head assembly.

The U.S. Pat. No. 4,608,045 to Fretwell teaches an applicator for impressing brands or medicaments on animals having a handle mounted for movement towards or from an applicator pad containing a liquid chamber communicating with a base, a part of which, having the configuration of the area over which liquid is to be applied to an animal, is liquid-permeable. A liquid container, which may serve as the handle, leads to the liquid chamber by way of a valve mechanism such that each movement of the handle towards the applicator pad as the pad base is pressed on an animal introduces to the liquid chamber liquid under pressure which is expelled through the liquid-permeable part of the applicator pad base.

The U.S. Pat. No. 4,747,720 to Bellehumeur et al. discloses A liquid applicator including a combined liquid container and handle with an axially extending, liquid permeable sleeve. An elongated tube having apertures throughout its length provides internal support for the sleeve and valve means provides controlled flow of the liquid from the container, through the tube and to the permeable sleeve. In another embodiment the applicator consists of an elongated arm having a threaded or snap connection for attachment to a squeeze type container. A plastic tube extends from the head to the container attachment and is enclosed by the arm.

The U.S. Pat. No. 4,882,874 to Paulson et al. teaches an applicator for applying a pesticide such as a herbicide with a solid carrier. The applicator comprises an elongated tube with a telescopic sleeve having a closure cap at one end for controlling the exposure of a pesticide-solid composition such as a herbicide wax-composition anchored to and projecting from the end of the elongated tube. The solid composition can be anchored to the end of the elongated tube such as by keying of the solid composition in a plurality of holes formed in the end of the tube.

The U.S. Pat. No. 4,902,155 to Buschemeyer discloses a liquid dispenser for dispensing a predetermined volume of liquid to a surface including a bottle for containing a supply of the liquid with a movable sleeve coaxially located with and receiving the outlet end of the bottle. The sleeve includes a valve which closes and away, respectively, from the bottle outlet. The sleeve also includes a metered liquid reservoir to the opposite side of the seal from the bottle outlet for receiving a predetermined measured amount of liquid from the bottle. A valve is located at the reservoir to control the flow of liquid from the reservoir, and a dauber tip is in liquid-flow communication with the reservoir for receiving liquid from the reservoir and dispensing the liquid on the surface.

The U.S. Patent No. to Longer teaches a fluid applicating apparatus provided for use with a cartridge having a self-sealing penetrable membrane and an inner volume containing fluid to be dispensed. The applicating apparatus includes an applicator located at one end of an elongated body, the applicator being formed of a porous, compressible material. The flow of fluid between the inner volume of the cartridge and the applicator is controlled by providing a penetrating member movable between a first position in which it penetrates the membrane and permits fluid communication between the inner volume and the applicator and a second position in which it is extracted from the inner volume upon removal of the penetrating member such that fluid does not leak from the inner volume when the penetrating member is withdrawn.

None of the foregoing prior art U.S. Patents teach or suggest the particular apparatus and method of the present invention.

A brief review of the prior art U.S. Patents reveals that a easy to use, simple apparatus and method for applying liquids is still needed.

SUMMARY OF THE INVENTION

The present invention broadly accomplishes its desired objects by providing an apparatus for dispensing a quantity of liquid directly on an object or surface, comprising an elongated container, having a valve assembly secured to one end thereof and communicating with the inside of the container for gravitationally releasing a liquid into a dispensing assembly when opened. A dispensing assembly is engaged or coupled to the elongated container for receiving the liquid dispensed from the valve assembly and dispensing the liquid from the apparatus. A retaining assembly is engaged to the dispensing assembly for retaining the dispensing assembly to the elongated container while simultaneously protecting the valve assembly from being over compressed or crushed. The elongated container typically is formed of a generally hollow cylindrical wall member having a proximal end and a distal end thereof. The proximal end has a generally circular top wall member secured to the cylindrical wall member and the distal end defines an opening for receiving a liquid into the cavity defined inside the container. A cap member is threadably secured to the distal end of the container for containing the liquid within the container cavity. The distal end of the container has threads for threadably coupling the cap member; likewise the cap member comprises a threaded inner face for threadably engaging the distal end of the container. A washer member is disposed in the cap member for sealing the coupling between the cap member and the container. The dispensing assembly comprises a generally hollow tubular wall member defining a proximal and distal ends thereof, wherein a generally circular end wall is secured to the proximal end of the tubular wall member. The distal end of the tubular wall member defines an open end for slidably receiving the proximal end of the container into a cavity defined by the tubular wall member. A generally circular platform member is secured to the end wall such that the platform member is generally coaxial and generally parallel with the end wall and the end wall has at least one aperture disposed therein. The valve assembly generally comprises a generally hollow cylindrical housing having a proximal housing and a distal housing opening, and a threaded exterior housing face and a threaded interior housing face. A valve body member has a threaded exterior body face and is threadably disposed in the cylindrical housing. The valve body member has a proximal body opening and a distal body opening and an actuator rod member defining a proximal rod end and a distal rod end. The actuator rod is slidably supported by at least one rod support member secured to the valve body member and is springably biased by a spring member disposed around the actuator rod member, which has one end thereof engaged to the least one support and another end thereof engaged to a spring rest member secured to the actuator rod. A generally conical stopper member is secured to the distal rod end of the actuator rod member and is adapted to be releasably and sealably coupled the distal body opening of the valve body member. The stopper member is disposed to be freely moved within the housing and responsive to the actuator rod member. The container of the dispensing assembly additionally comprises an end cap assembly releasably secured thereto having a fluid retaining means for retaining liquid communicated thereto and transferring the liquid therefrom to an object.

The present invention further accomplishes its desired objects by providing a method for applying a fluid to an object comprising the steps of:

(a) providing a fluid dispensing apparatus comprising an elongated container having a valve assembly secured to one end thereof and communicating with the inside of the container, a dispensing assembly engaged to the elongated container for receiving liquid dispensed from the valve assembly and dispensing the liquid from the apparatus, and a retaining means engaged to the dispensing assembly for retaining the dispensing assembly to the elongated container while simultaneously protecting the valve assembly from over compression;

(b) providing a liquid;

(c) providing an object for having fluid applied thereto;

(d) disposing the liquid into the container of the dispensing apparatus;

(e) placing the dispensing assembly of the dispensing apparatus contiguous to the object;

(f) applying pressure to the container to move the valve assembly secured thereto into the dispensing assembly to cause the valve assembly to actuate;

(g) passing a portion of the fluid through the valve into the dispensing assembly; and (h) transferring the portion of fluid from the dispensing assembly to the object.

It is therefore an object of the invention to provide an apparatus and method for applying a liquid to an object and/or surface.

These, together with the various ancillary objects and features which will become apparent to those skilled in the art as the following description proceeds, are attained by this novel method and apparatus, a preferred embodiment as shown with reference to the accompanying drawings, by way of example only, wherein;

DETAILED DESCRIPTION OF THE INVENTION

Figure 1:
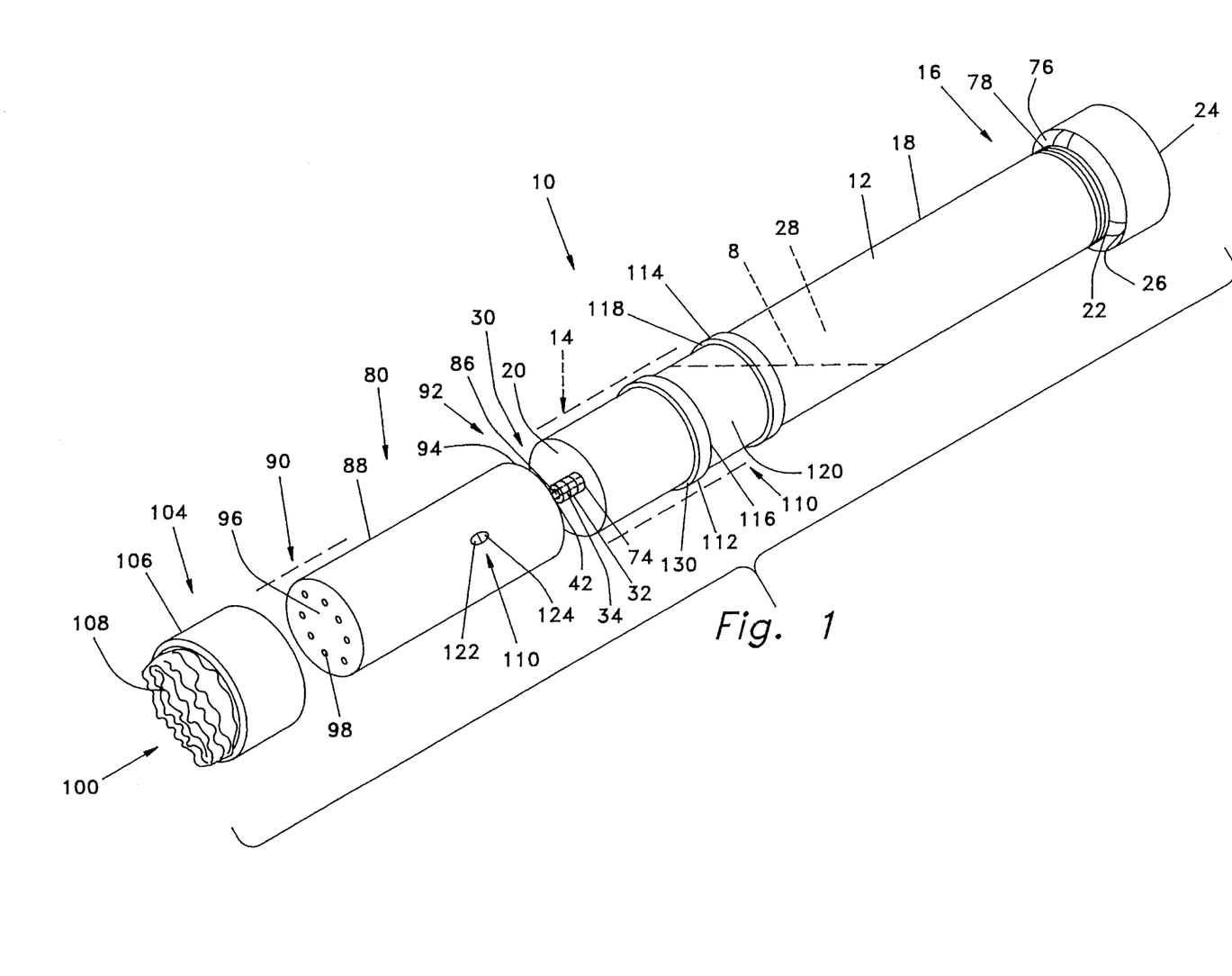
FIG. 1 is a segmented perspective view of the liquid dispensing apparatus of the present invention.
Figure 5:
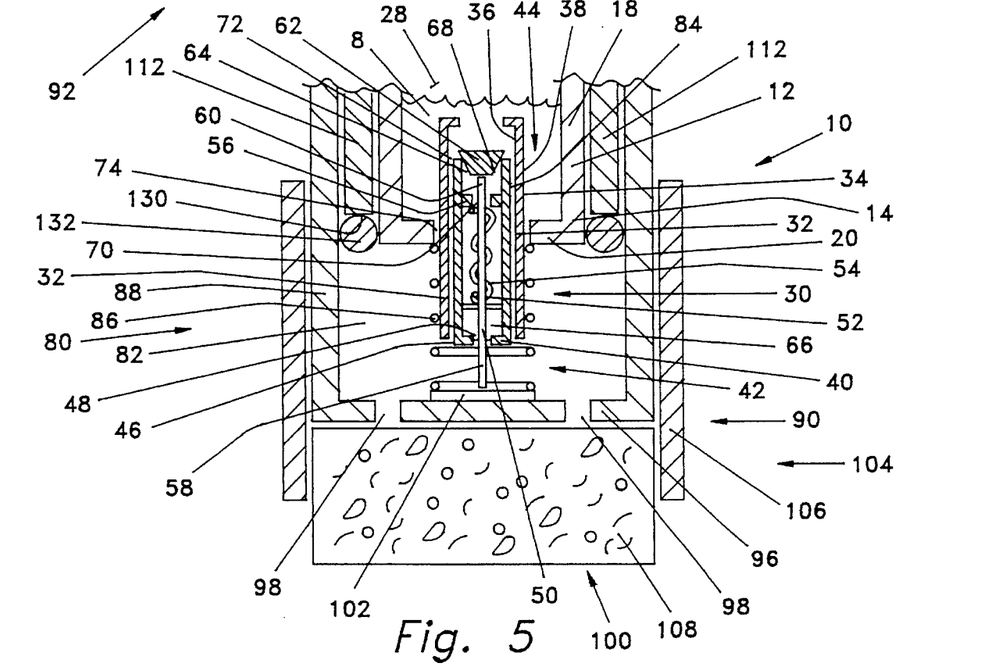
FIG. 5 is a partial cross sectional view of a dispensing assembly of the dispensing apparatus of the present invention with the valve assembly thereof in a closed position and disclosing a gasket member between the dispensing assembly and a container.
Figure 6:
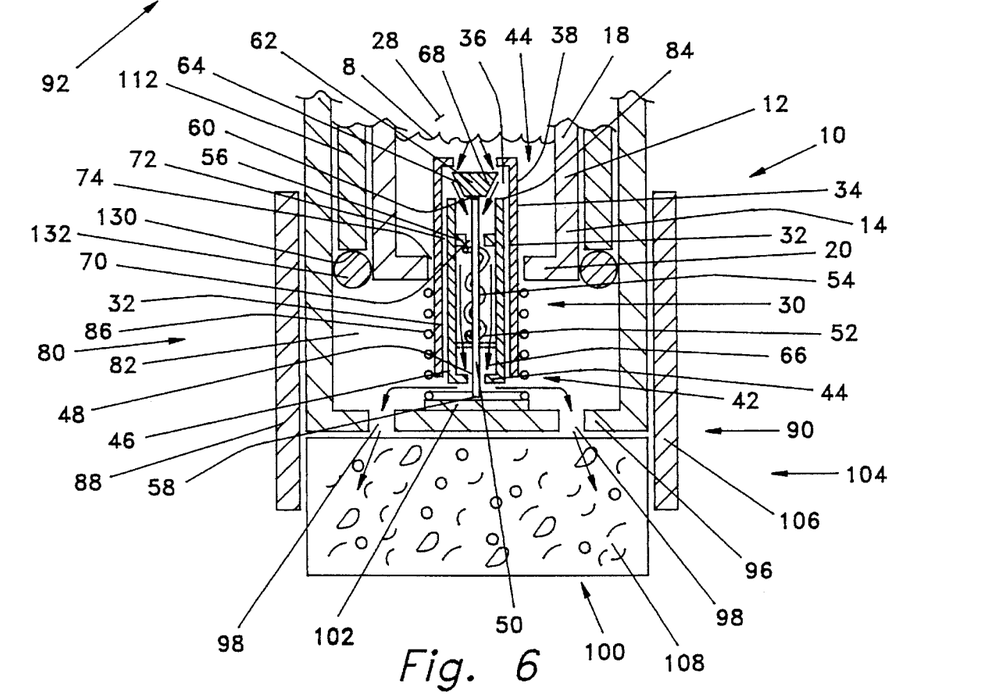
FIG. 6 is a partial cross sectional view of a dispensing assembly of the dispensing apparatus of the present invention with the valve assembly thereof in an open position and with the arrows indicating direction of fluid flow therethrough and disclosing the gasket member between the dispensing assembly and the container.

Turning now to the drawings where similar parts of the invention are identified with like reference numbers, there is seen the apparatus for dispensing liquid in FIG. 1, generally identified as 10. The dispenser 10 comprises an elongated container 12 defining a proximal end 14 and a distal end 16. As seen in FIGS. 5 and 6, the elongated container 12 defines an inner cavity or hollow space wherein a liquid S, such as pesticide, herbicide, water, or the like may be contained for subsequently being dispensed or applied or otherwise transferred from the container 12 to an object, such as a plant or an insect, as will be further explained in the following.

Figure 2:
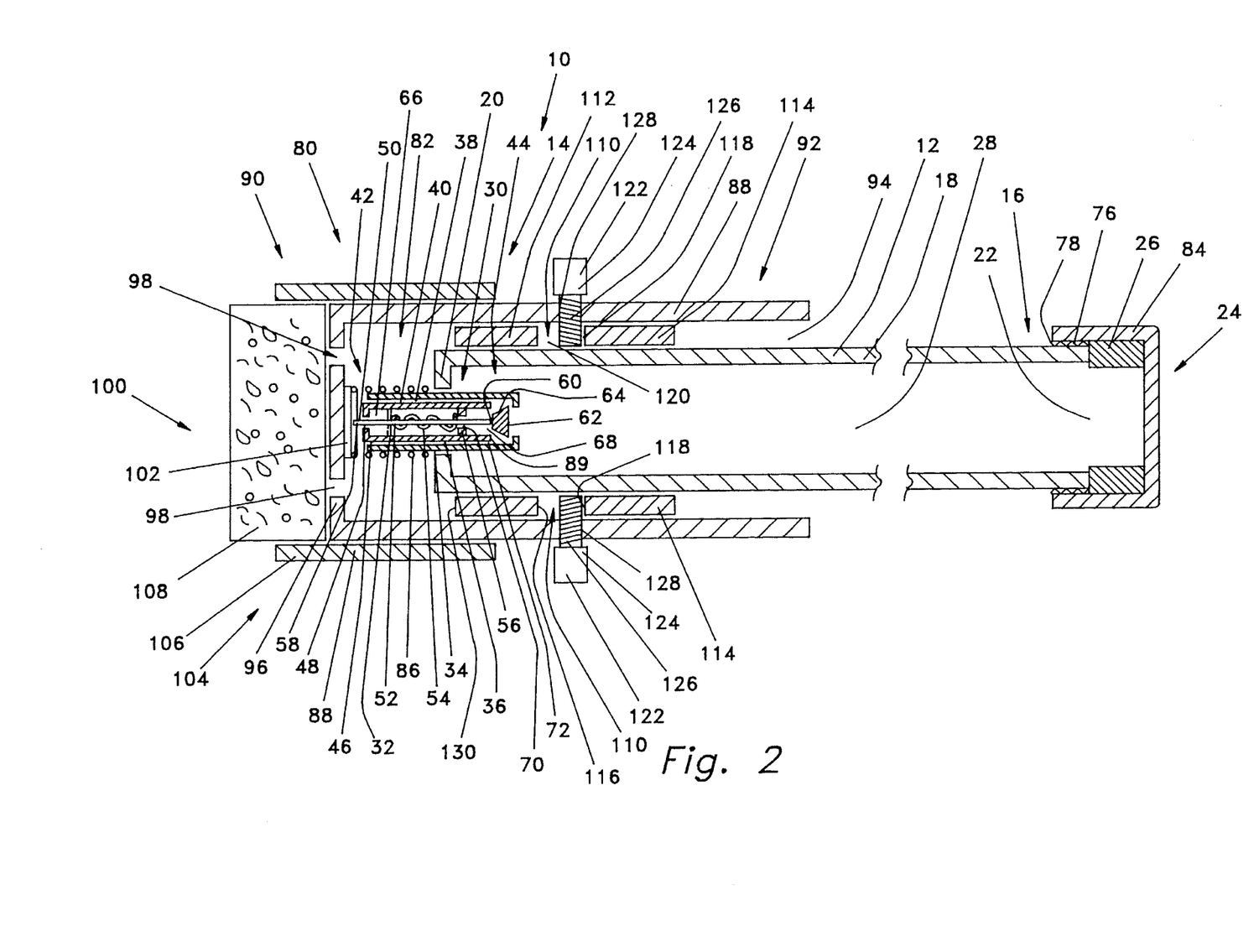
FIG. 2 is a cross sectional view of the liquid dispensing apparatus of the present invention in a compressed or dispensing state.

The elongated container 12, as best shown in one preferred embodiment in FIG. 1, comprises a structure defining a generally hollow tubular or cylindrical side wall member 18 having a top wall member 20 integrally bound to or secured to the proximal end 14 of the container 12, and an opening or aperture 22 disposed or formed into the distal end 16 over which a cap member 24 is releasably coupled. The cap member 24 is preferably threadably engaged to the distal end 16 of the side wall member is such that the cap member 24 may be removed by unscrewing same from the container 12, however it is understood any suitable means is included for securing the cap member 12 to the distal end 16, such as by way of example only, frictionally engaging the cap member 24 thereto. Therefore, in one preferred embodiment as shown in FIG. 2, the cap member 24 comprises an generally annular or generally circular wall member 84 having a threaded inner surface 76 for mating with corresponding threads 78 formed into or secured to the distal end 16 of the tubular or cylindrical wall 18 of the container 12. A washer member 26 is disposed in the cap member 24 and has a diameter so as to fit within the cap member 24 and create a fluid-tight closure between the cap member 24 and the distal end 16 of the side wall member 18 of the container 12 for containing liquid 8 within the container 12. As will be further discussed, the cap member 24 may be secured tightly to the container 12, or secured loosely (i.e. released somewhat) such that the cap 24 covers the opening 22 while allowing for atmospheric pressure equalization of an interior cavity or hollow space 28 of the container 12.

Figure 4:
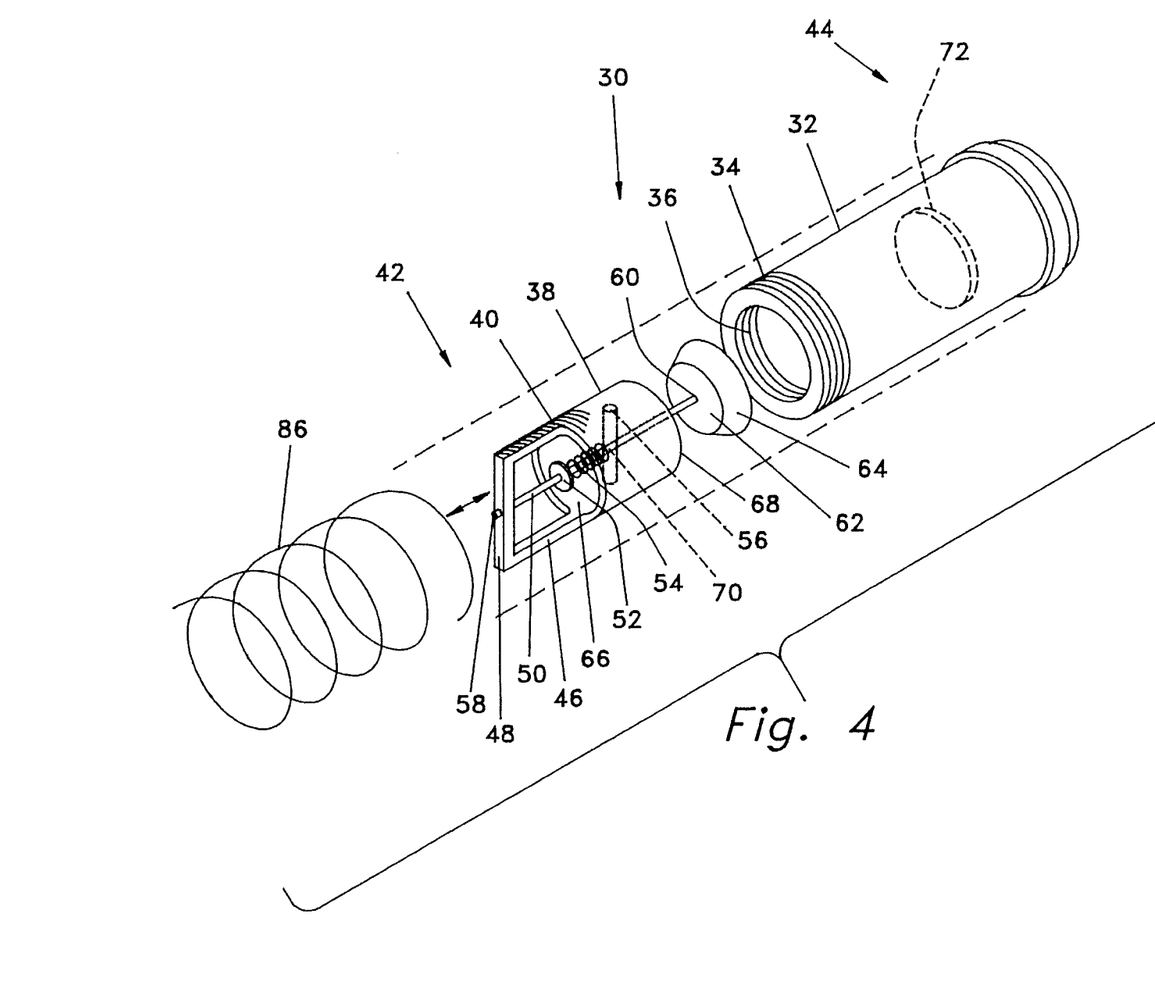
FIG. 4 is a segmented perspective view of a valve assembly of the liquid dispensing apparatus of the present invention.

A valve assembly, as best shown in FIG. 4 and generally illustrated as 30 is provided for selectively allowing liquid 8 to pass from the container 12 (i.e. to allow the fluid or liquid 8 to flow from the interior cavity 28 through the valve assembly 30). The valve assembly 30, in one preferred embodiment shown in FIG. 4, has a distal end 44 and a proximal end 42 and comprises a structure defining a generally hollow cylindrical body or housing 32 which has a threaded outer surface 34 and a threaded inner surface 36. A generally hollow cylindrical valve body member 38 has a threaded outer surface 40 for threadably engaging the threaded inner surface 36 of the cylindrical housing 32 to couple or removably secure the valve body member 38 within the cylindrical housing 32 in a concentric or coaxial fashion. The valve body member 38 additionally defines a proximal opening 66 and a distal opening 68 such that fluid may pass through the valve body member 38, as will be further discussed in the following.

A generally U-shaped support member 46 is secured to the valve body member 38 such that the U-shaped support member is generally aligned with or generally proximal to the proximal end 42 of the valve assembly 30 and/or the proximal opening 66 of the valve body member 38, and has an aperture 48 for slidably receiving an actuator rod member 50. As shown in FIG. 4, the actuator rod 50 is generally concentric or coaxial with the valve body member 38 and the cylindrical housing 32, and is further supported by a support member 56 which is secured within the valve body member 38. The actuator rod 50 slidably passes through an aperture 70 disposed in the support member 56, and a helical compression spring is disposed around the actuator rod 50 and has opposed ends thereof respectively abutted against the support member 56 and a spring rest member 52 which is secured to the actuator rod 50, to bias the actuator rod towards the proximal end 42 of the valve assembly 30, such that when a proximal end 58 of the actuator rod 50 is pressed, a spring action potential causes the actuator rod 50 to return to a resting state or less biased state, corresponding to a closed position (see FIG. 5) of a stopper member (identified as 62 below) when the actuator rod 50 is released.

The distal end 60 of the actuator rod 50 has a stopper member 62 secured thereto for closing the distal opening 68 of the valve body member 38 to arrest fluid flow therethrough. In one preferred embodiment of the present invention, the stopper member 62 is formed of rubber or plastic or similar inert material suitable for being wedged in the circular distal opening 68 of the valve body member 38 by the spring bias of spring member 54 on the actuator rod 50 pulling the stopper member 62 into the distal opening 68 to arrest fluid flow therethrough. Preferably, the stopper member 62 is formed of any suitable material that is generally non-reactive to herbicides, pesticides, or the like, such as polyelastomerics or butyl rubber. In some embodiments of the invention, it may be preferred to fabricate the stopper member from aluminum or a similar metal which is machined or fitted to engaged the distal opening 68 defined by the valve body member 38. The stopper member, as best seen in FIG. 4, has a structure generally defining a conically arranged side wall 64 terminating in generally parallel opposed circular walls (i.e. the stopper member 62 forms a trapezoid shape in vertical cross section, as shown in FIG. 5). The conical side wall 64 engages the circular edge of the distal opening 68 defined by the valve body member 38 when the actuator rod 50 is in a steady-state (i.e. minimum spring bias) position as shown in FIG. 5 due to the expansion of the spring 54 against the support member 56 and the spring rest 52 which biases the actuator rod 50 toward the proximal end 42 of the valve assembly and accordingly pulls the stopper member 62 into the distal opening 68 to sealably couple the same. When the actuator rod 50 is in a distal position, as shown in FIG. 6 (i.e. the actuator rod 50 is pressed on the proximal end 58), the stopper member 62 is forced away from the distal opening 68 of the valve body member 38 and thereby allows for fluid to be communicated through the valve body member 38. Although a preferred embodiment of the valve assembly 30 has been described, it should be understood that any suitable valve assembly that allows fluid to pass through the same when an actuator or valve or the like is springably depressed is included in the spirit and scope of the present invention. Further, it may be appreciated that a gasket member or a washer 84 (see FIGS. 2, 3, 5 and 6) or the like may be disposed between the edge defined by the valve body member 38 at the distal opening 68 and the stopper member 62 to facilitate sealing the coupling therebetween when the stopper member 62 is in a closed position (preferably when the stopper member is made of a metal or metal alloy, such as aluminum or brass). Such a gasket is included in the spirit and scope of the present invention.

As previously indicated, the valve body member 38 is threadably disposed in the cylindrical housing 32 (see FIG. 4). As best seen in FIGS. 5 and 6, the valve body member 38 is generally housed within or contained by the cylindrical housing 32. An annular flange or lip member 72 is secured to the inside face or surface 36 of the cylindrical housing 32 for engaging the distal end 68 of the valve body member 38 and for establishing a leak-proof coupling between the cylindrical housing 32 and the valve body member 38 such that any and all fluid passing through the valve assembly 30 is regulated exclusively by the actuator rod/stopper member 50/62 combination. It may be appreciated that a gasket member or a washer or the like may be disposed between the valve body member 38 and the annular flange member 72 to facilitate sealing the coupling therebetween. Such a gasket is included in the spirit and scope of the present invention.

Figure 3:
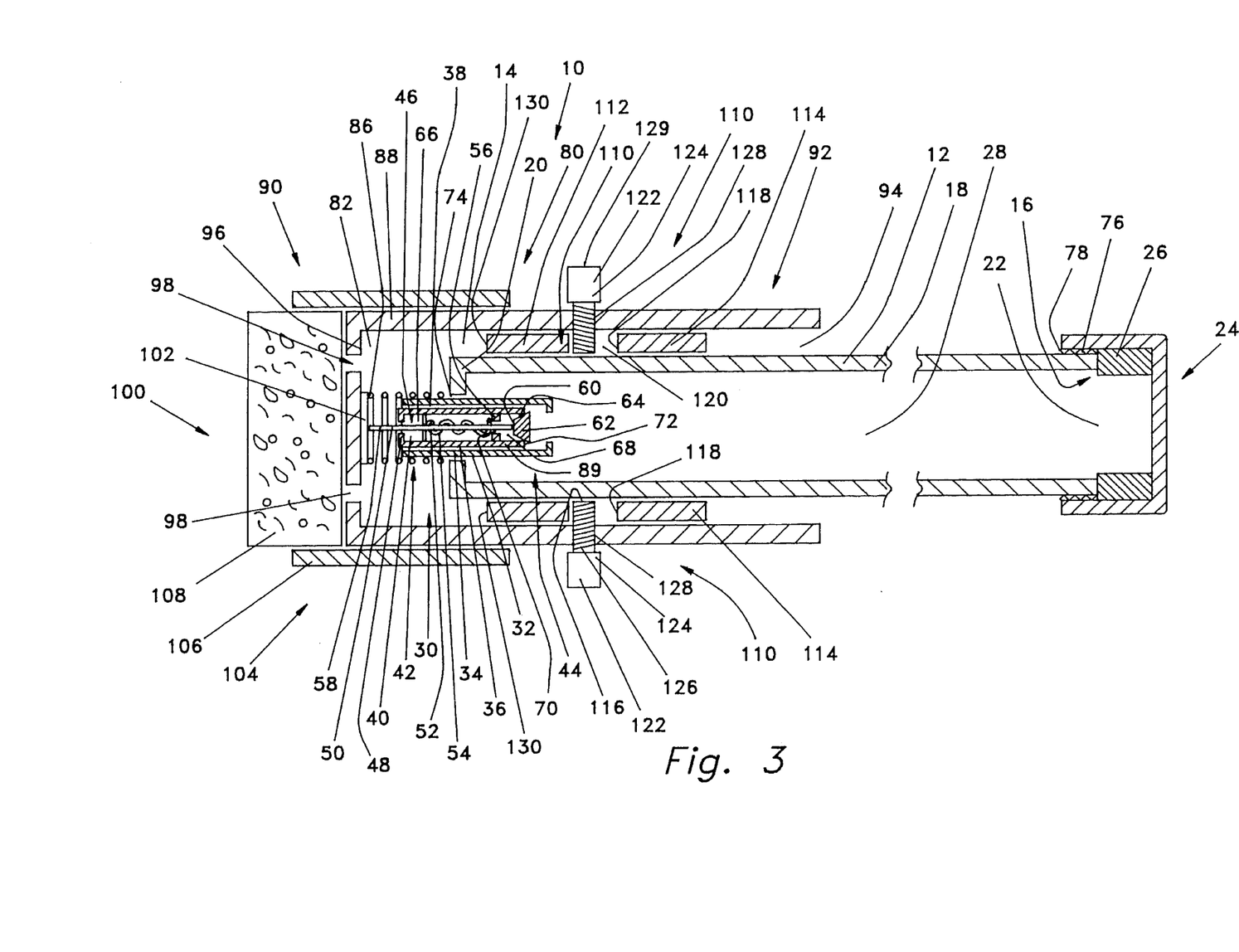
FIG. 3 is a cross sectional view of the liquid dispensing apparatus of the present invention in a non-compressed or retaining state.

The valve assembly 30, (i.e. the valve body member 38 and the cylindrical housing 32) regulates the flow of fluid 8 (see FIG. 1) from the container 12 through the same and into a dispensing assembly, generally illustrated as 80. As best shown in FIG. 3, the dispensing assembly 80 is suited to slidably fit over the container 12. As will be further discussed the dispensing assembly comprises a generally tubular or cylindrical wall member identified as 88 below which coaxially or concentrically partially encircles the proximal end 14 of the container 12. The valve assembly 30 is situated in the top wall member 20 of the container 12 so as to be acted upon by the dispensing assembly 80 to regulate fluid 8 communication between the cavity or hollow space 28 of the container 12 and an interior portion 82 of the dispensing assembly 80. The valve assembly 30, in the preferred embodiment shown in FIG. 3, is threadably engaged to a threaded aperture 74 disposed in the top wall member 20 such that when the stopper member 62 is in an open position (i.e. the actuator rod 50 is depressed, as will be more completely explained in the following), fluid from the container 12 may flow through the proximal opening 66 of the valve body member 38 of the valve assembly 30 and into the interior portion 82 of the dispensing assembly 80. The valve assembly 30 is preferably arranged in a generally coaxial or concentric posture relative to the container 12 to facilitate move even distribution of fluid (i.e. fluid 8 as seen in FIG. 5) from the proximal opening 66 and to more evenly engage the dispensing assembly as will be further discussed, and is generally perpendicular or generally normal to the plane of the top wall member The dispensing assembly 80 comprises a proximal end 90 and a distal end 92 and has a generally cylindrical or generally tubular wall member 88 defining an opening or aperture 94 at the distal end 92 and a top wall member 96 secured to the tubular wall member 88 at the proximal end 90. At least one aperture 98 is disposed in the top wall member for allowing fluid (i.e. fluid 8, see FIGS. 5 and 6) to pass from the inner cavity 82 of the dispensing assembly 80 through the least one aperture 98 to a fluid retaining means, generally illustrated as 100 in FIG. 2, for retaining and/or transferring fluid retained to an object or surface. Preferably, the top wall 96 has a plurality of apertures 98 disposed therein for providing a more even distribution of fluid (i.e. fluid 8 as seen in FIG. 1) transferred from the cavity 82 of the dispensing assembly 80 as fluid is transferred from the container 12 through the valve assembly 30 into the cavity 82 of the dispensing assembly 80. As will be seen, the fluid 8 (see FIGS. 5 and 6) transfers from the container 12 through the valve assembly 30 into the cavity 82 of the dispensing assembly 80 to be transferred through the least one aperture 98 (preferably a plurality of apertures 98) into the fluid retaining means 100 where it is releasably contained for being transferred to an object or surface, such as a plant, weed, sidewalk, insect or the like. The top wall 96 further comprises a platform member 102 secured to an inner face thereof. The platform member 102 is preferably generally circular and preferably concentrically or coaxially arranged such that the actuator rod 50 of the valve assembly 30 is generally coaxially or concentrically aligned with the platform member 102 and such that the actuator rod is generally normal or generally perpendicular thereto. The platform member 102 is therefore generally parallel to the top wall member 20 of the container 12 and generally parallel to the top wall 96 of the dispensing assembly 80. A helical compression spring member 86 is partially circumferentially arranged around the cylindrical housing 32 of the valve assembly 30 and has one end thereof generally extending beyond the proximal end 58 of the actuator rod 50 and coaxially aligning with the platform member 102 such that the outer circumference of the spring member 86 is generally aligned with the outer circumference of the platform member 102. The spring member 86 biases the top of the dispensing assembly 80 away from the valve assembly 30 to prevent fluid from being communicated therefrom. As will be further discussed in the proceeding, the dispensing assembly 80 is pressed or pushed against the bias of the spring member 86 such that the platform member 102 engages the actuator rod 50 to release the stopper member 62 (see FIGS. 5 and 6) and enable fluid communication through the valve assembly 30.

It can be seen that the dispensing assembly 80 forms a bounded (i.e. the top wall 96 bounds the dispensing assembly annular sleeve which is coaxially arranged about the proximal end 14 of the container 12. The excursion or sliding action of the dispensing assembly 80 is limited by a regulating means, generally illustrated as 110 in FIG. 2, for protecting the actuator rod 50 of the valve assembly 30 from being hyper-extended (i.e. pressed towards the distal end 44 of the valve assembly 30 too far) and simultaneously for preventing the dispensing assembly 30 from sliding off of the proximal end 14 of the container 12. In a preferred embodiment, the regulating means 110 comprises a pair of spacedly disposed annular sleeves or rings, generally illustrated as 112–114, proximal to the proximal end 14 of the container 12. The sleeve 112 comprises a distal face 116 which faces a proximal face 118 of the sleeve 114, which is situated contiguous to the sleeve 112. An annular cavity or channel 120 is defined between the two annular sleeves 112–114, such that the combination of the distal face/channel/proximal face 116/120/118 generally form a U-shape. As shown in FIG. 2, the cylindrical or tubular wall 88 has a diameter which is sized appropriately to accommodate the annular sleeves 112–114 and slidably pass there-over. The regulating means further comprises at least one retaining screw member 122 having a screw head 124 and a threaded section 126 which is threadably disposed in a corresponding retaining screw aperture 128. The screw retaining aperture 128 and the screw member 122, as shown in FIG. 2, are superimposed over and aligned with the channel 120 between the annular sleeves 112–114 such that the threaded section 126 of the screw member 122 protrudes through the cylindrical wall ee of the dispensing assembly 80 and into the channel 120. The screw member 122 has a length such that when fully threaded into the cylindrical wall 88 of the dispensing assembly 80, the screw head 124 abuts the outer face of the cylindrical wall 88 before the threaded section 126 contacts the container 12. As can be seen in FIG. 2, the threaded section 126 of the screw member 122 contacts the distal face 116 of the annular sleeve 122 when the dispensing assembly 80 is in a resting state (i.e. a state corresponding to a closed position of the stopper member 62 of the valve assembly 30 which interrupts fluid flow from the container 12 into the dispensing assembly 80) and/or contacts the proximal face 118 of the sleeve 114 when the dispensing assembly is in a pressed or pushed state (i.e. a state corresponding to an open position of the stopper member 62 of the valve assembly 30 which enables fluid flow from the container 12 into the dispensing assembly 80). When the dispensing assembly 80 is pressed (or if the container 12 is pressed against the dispensing assembly 80), the threaded section 126 of the screw member 122 contacts the distal face 116 of the annular sleeve 112 and prevents the dispensing assembly 80 from pressing or pushing the actuator rod 50 of the valve assembly 30 too far. Preferably, at least two screw members 122 are equispaced in corresponding apertures 128 for limiting the excursion of the dispensing assembly 80, most preferably three screw members 122 are equispaced in corresponding apertures 128 for limiting the travel of the dispensing assembly 80. The width of the channel 120 defines the amount of travel allowed for the dispensing assembly 80, since the longitudinal travel of the threaded section 126 of the screw member 122 is limited by the width of the channel 120. It is understood that, although a preferred regulating means 110 comprises the annular sleeves 112–114, the channel 120, and the screw member(s) 122, any suitable means for regulating the excursion or travel of the dispensing assembly 80 relative to the container 12 may be employed without departing from the spirit and/or scope of the present invention, such as by way of example only, a lip or flange member secured to the container for abutting a distal edge of the dispensing member.

The fluid retaining means 100 of the dispensing assembly 80, as shown in FIG. 2, may comprises any suitable means capable of holding a fluid and transferring, relaying, imparting, or otherwise applying same fluid when contacting an object or surface, such as by way of example only, comprising a cellulosic sponge member 108 and/or an end cap assembly 104 which is secured to one end of a generally hollow cylindrical or tubular wall member 106 and situated over the aperture(s) 98 of the dispensing assembly 80. Thus, the fluid retaining means 100 may consist only of the sponge member 108 secured or bound to the cylindrical wall 88. The cylindrical wall 106 of the end cap assembly 104, preferably frictionally fits over the cylindrical wall 88 of the dispensing assembly 80 such that the sponge member 108 is in communication with the aperture(s) 98 and receives any and all fluid 8 which passes therethrough (see FIG. 6). Thus, the cylindrical wall 106 is coaxially or concentrically arranged with the dispensing assembly 80 and/or the container 12. It may be appreciated that the end cap and the proximal end of the dispensing assembly so may have threads on their respective inner and outer surfaces for being threadably coupled together; and such a threaded end cap assembly 104 and dispensing assembly 80 shall not depart from the spirit and/or scope of the present invention. It is understood that the end cap assembly 104 is removable and/or replaceable for easy cleaning and/or multiple fluid application requirements. For example, one end cap assembly 104 which might be saturated with a pesticide, can be removed from the apparatus and replaced with another end cap assembly 104 for being saturated with a herbicide. In this manner, the need for a thorough cleaning of the end cap assembly 104 soaked with pesticide is eliminated.

In one embodiment of the invention as shown in FIGS. 5 and 6, a gasket member 132 may be secured to a proximal face 130 of the annular sleeve 112 and/or the cylindrical wall 18 of the container for sealably engaging the inner surface of the cylindrical wall 88 of the dispensing assembly 80 to prevent fluid 8 from flowing or leaching or dripping along the length the container 12. The gasket member 132 further serves to create a slight pressure differential in the dispensing assembly's 80 cavity 82 to aid in the transference of the fluid 8 (see FIG. 6) to the fluid retention means 100 (i.e. sponge member 108) by forcing the fluid through aperture(s) 98 under a slight pressure. In this embodiment, it is appreciated that the cap member 24 (not shown in FIGS. 5 and 6) is generally tightened to prevent back feeding of the pressure generated through the cavity 28 of the container 12, and to maintain a slight pressure differential created by the action of the gasket member 132 generating slight pressure in the dispensing assembly 80 which is communicated to the container 12 while the valve assembly 30 is open and which remains in the container 12, as the valve assembly 30 closes prior to pressure equalization. The action of the gasket member 132 will be further discussed below.

Figure 9:
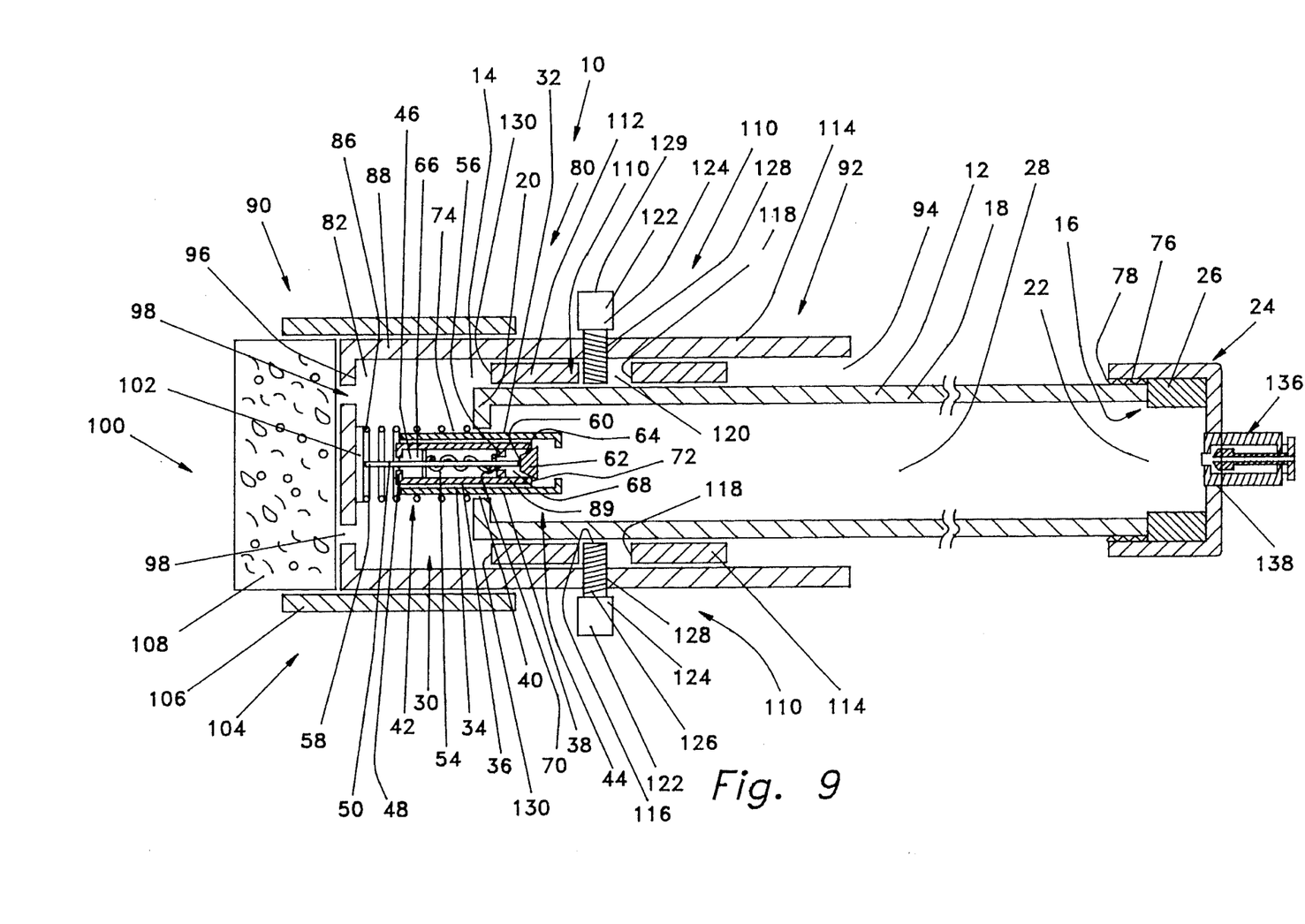
FIG. 9 is a cross sectional view of the liquid dispensing apparatus of the present invention in a non-compressed or retaining state disclosing a pump member in a cap member for pressurizing the container.

It is appreciated that, as shown in FIG. 9, one embodiment of the present invention comprises a finger operated pressurizing pump member 136 disposed in an aperture 138 which is disposed in the cap member 24 (see FIG. 1) to establish a pressure differential in the cavity 28 of the container 12, to forcibly eject the fluid 8 through the valve assembly 30 under air pressure when the valve assembly 30 is opened (i.e. actuator rod 50 is pressed by the dispenser member 80 platform 102 to open the stopper member 62). Such a pressurizing member 136 may be any suitable hand operated pump member capable of being disposed in the cap member 24 and any suitable pump member 136 is included in the spirit and scope of the invention.

Thus in summary, the present invention (see FIG. 1) comprises the dispensing assembly 80 coaxially and slidably disposed to the container 12 having the regulating means 110 for governing or limiting the amount of slidability of the dispensing assembly 80 relative to the container 12. The valve assembly 30 is situated in the proximal end 14 of the container 12 for being actuated (i.e. opened) when the dispensing assembly 80 is slidably moved towards the proximal end 14 of the container 12, for facilitating the release of the fluid 8 held in the container 12 into the dispensing assembly 80.

Figure 7:
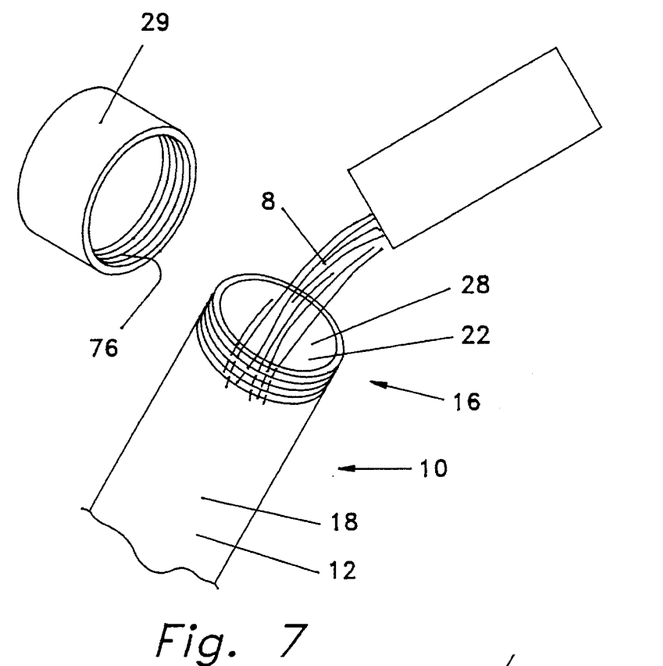
FIG. 7 is a partial perspective view of one end of the dispensing apparatus with a cap member removed therefrom for pouring a fluid thereinto.
Figure 8:
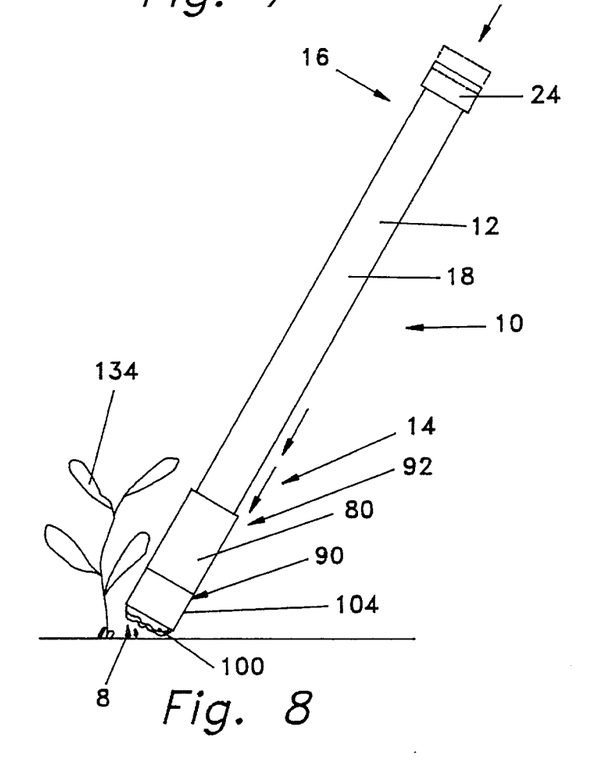
FIG. 8 is a side elevational view of the dispensing apparatus applying liquid on or around a weed by pressing on the end opposite the dispensing assembly to effect fluid flow therethrough.

Referring now to the drawings for operation and use of the present invention, the dispensing apparatus 10 is provided. The cap member 24 is unscrewed from the container 12 and fluid 8, such as herbicide, pesticide, water, or the like is poured into the container 12 (see FIG. 7) and the cap member 24 is threadably coupled to the container 12. The end cap assembly 104 is coupled to the proximal end 90 of the dispensing assembly 80 and the dispensing apparatus 10 is then turned or situated such that the proximal end (i.e. the end having the dispensing assembly 80 and the end cap assembly 104 thereof coupled thereto) is generally proximal or contiguous to a surface or an object, such as a plant 134, as shown in FIG. 8. Where the dispensing apparatus 10 is being used to apply herbicide to a weed, the apparatus 10 is situated directly on the offending weed, in a generally vertical stature with the sponge member 108 of the end cap assembly 104 in contact therewith. As shown in FIG. 5, the dispensing assembly 80 is in a resting or closed state such that no fluid is being communicated through the valve assembly 30. The spring member 86 is in contact with the platform member 102, and, as shown in FIG. 3, the actuator rod 50 of the valve assembly 30 is in a steady state position which corresponds to a closed status or position of the stopper member 62 due to spring member 54 biasing the actuator rod 50 and the stopper member 62 towards the proximal end 42 of the valve assembly 30.

To commence fluid flow through the valve assembly 30, downward force is applied to the distal end (i.e. cap member 24 and/or distal end 16 of the container 12) to cause the container member 12 (and its associated regulating means 110, spaced sleeves 112–114) to slide longitudinally within the dispensing assembly 80. It is appreciated that the converse is true; the dispensing assembly 80 may be longitudinally moved or slid along the container 12; however, the dispenser member 80 is typically in contact with a surface or object, such as plant 134, to receive the fluid contained within the dispensing apparatus 10 and is therefore generally stationarily abutted against same such that the movement of the dispensing assembly 80 relative to the container 12 necessary for actuating the valve assembly 30 is realized by moving the container 12.

As force is applied to cause the container 12 and the dispensing assembly 80 to longitudinally slide relative to each other, spring bias potential of spring 102 is overcome and the proximal end 58 of the actuator rod 50 contacts the platform member. As the pressure or downward force is further and/or gradually, continually increased or applied, the spring bias potential of spring 86 of the valve assembly 30 is overcome, and the platform 102 is pressed against the actuator rod 50 which causes the actuator rod 50 to slide longitudinally and move the stopper member 62 secured thereto distally. The distal opening 68 of the valve body member 38 is thus opened (see FIG. 6) and fluid 8 communication between the container 12 and the dispensing assembly 80 is thereby established. As continuing pressure or force is applied to the distal end of the apparatus 10 (i.e. cap member 24 and/or distal end 16 of the container 12 is pushed or otherwise moved longitudinally relative to the dispensing assembly 80), the threaded section 126 (see FIG. 2) of the bolt member 122 engages the proximal face 118 of the annular sleeve 114 and arrests and/or resists any additional longitudinal force or pressure applied to stop the dispensing assembly 80 from moving any further in the distal direction relative to the container 12 in order to prevent damage to the valve assembly 30 (i.e. to prevent the valve assembly 30 from being crushed or "smashed" by the platform 102 of the dispensing assembly 80).

Fluid 8 gravitationally and/or hydraulically (i.e. a hydrostatic head force established comprising either air pressure in the container 12 and/or dispensing assembly 80 or hydrostatic or capillary pressure) flows in direction of the arrows in FIG. 6 from the container 12 into the dispensing assembly's 80 cavity 82 where it gravitationally and/or hydraulically leaches or flows into the sponge member 108 of the end cap assembly 104. The sponge member 108 thus becomes saturated with the fluid e (see FIG. 6) and is positioned to dispense fluid 8 onto grass, plant, or the like. Pressure or force may then ceased or removed from the distal end of the dispensing apparatus be (i.e. cap member 24 and/or distal end 16 of the container 12). The action potential stored in the spring member 86 biases the dispensing assembly 80 away from the valve member 30 such that the dispensing assembly 80 is moved in a proximal direction; that is the valve assembly 30 is springably forced away from the platform member 102 of the dispensing assembly 80 under the spring bias of the spring member 86. As the dispensing assembly 80 is forced away from the container 12 under the bias of spring member 86, the actuator rod 50, under the influence of the stored potential energy of the spring 54 coupled thereto, moves proximally (i.e. slides longitudinally under the influence of the spring 54 in a towards the proximal end of the apparatus 10). The actuator rod 50 continues to slide proximally until the stopper member 62 (see FIG. 5) engages the distal opening 68 and/or the gasket 84 of the valve body member 38 to close the communication or transference of fluid 8 from the container 12 through the valve assembly 30. Simultaneously, and/or during or at the end of the entire process, the sponge member 108 (i.e. fluid retaining means 100) is used to transfer fluid 8 retained thereby to an object desired to receive same fluid 8 (see FIG. 8). The sponge member 108 contacts the object (i.e. plant 134) to transfer a portion of the fluid 8 to the same.

As indicated previously, the dispensing apparatus 10 may have the gasket or O-ring member 132 disposed between the dispensing assembly 80 and the container 12 for sealing junction or coupling of the dispensing assembly 80 to the container 12 such that the interior cavity or space 82 of the dispensing assembly 80 may only communicate fluid 8 (see FIG. 6) from the aperture(s) 98 in the top wall 96 and/or to prevent some of the fluid 8 from hydrostatically or gravitationally flowing along the length of the container 12, especially when the dispensing apparatus 10 is turned such that the proximal end 14 of the container 12 is elevated or in a higher posture relative to the distal end 16.

In the embodiment of the present invention including the gasket or O-ring member 132, the action of applying force or pressure to the distal end (i.e. cap member 24 and/or distal end 16 of the container 12) of the apparatus 10 has the additional benefit of generating a slight pressure within the interior portion 82 of the dispensing assembly 80. The slight pressure generated is additionally communicated to the interior portion 28 of the container 12 when the valve assembly 30 is in an open position (i.e. actuator rod 50 is in a distal position corresponding to an open posture of the stopper member 62 to the distal opening 68 of the valve body member 38) and serves to facilitate additional flow of fluid 8 from the container 12 through the valve assembly 30 as previously indicated. The pressure potential that is communicated to the container 12 is maintained within the container 12 as long as the valve assembly 30 remains closed and the cap member 24 is tightened (i.e. the cap member 24 is threadably engaged to the container 12 such that the washer member 26 seals the cap 24 to the container 12). As further previously indicated, the dispensing apparatus 10 may comprises a pump member (not shown in the drawings) for generating or supplying air pressure to the container 12 to pressurize same. In this embodiment, the cap member 24 is sealably engaged to the container 12 subsequent to disposing fluid 8 therein and the pump member is operated to establish a pressure differential within the container 12. The pressure thus establishes serves to force and/or to assist the transfer of the fluid 8 from the valve assembly 30 when the valve assembly 30 is opened.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. An apparatus (10) for dispensing a quantity of liquid comprising an elongated container (12); a valve assembly (30) secured to an end (14) of said elongated container communicating with inside of same for gravitationally releasing a liquid (8) into a dispensing assembly; a dispensing assembly (80) engaged to said elongated container for receiving a liquid dispensed from said valve assembly and dispensing said liquid from said apparatus; a regulating means (110) engaged to said dispensing assembly for retaining said dispensing assembly to the elongated container while simultaneously protecting said valve assembly from hyper-compression; said dispensing assembly comprising a generally hollow tubular wall member (88) defining a second proximal end (90) and a second distal end (92) thereof; said second proximal end of said tubular wall member having a generally circular end wall (96) secured thereto; said second distal end defining a dispenser open end (94); said dispensing assembly defining a dispenser cavity (82) therein; a generally circular platform member (102) secured to said generally circular end wall (96) such that said platform member is generally coaxial and generally parallel with said generally circular end wall; and said generally circular end wall having at least one aperture (98) disposed therein; a cap member (24) threadably secured to said container for containing said liquid; said cap member comprising a threaded inner face (76) for threadably engaging said container and a washer member for sealably coupling the cap member to the container; and wherein said dispensing assembly additionally comprises an end cap assembly (104) releasably secured thereto; said end cap assembly comprising fluid retaining means (100) for retaining liquid communicated thereto and transferring said liquid therefrom to an object; and said fluid retaining means comprising a cellulosic sponge member (108); and a pump member (136) disposed in said cap member (24) for pressurizing said container (12); and wherein said means for retaining said dispensing assembly comprises a pair of annular sleeves (112,114) secured to said container defining an annular channel (120) therebetween for receiving a screw member; a screw member (122) threadably disposed in said dispensing assembly for being received by said annular channel; said annular channel comprising a channel width wherein said screw member may longitudinally slide between said pair of annular sleeves within said channel.

2. The apparatus of claim 1 wherein said valve assembly (30) comprises a third proximal end (42) and a third distal end (44) thereof; a generally hollow cylindrical housing (32) having a threaded exterior housing face (34) and a threaded interior housing face (36); a valve body member (38) having a threaded exterior body face (40), a proximal body opening (66), and a distal body opening (68); said valve body member being threadably disposed within said generally hollow cylindrical housing; said valve body member further comprising an actuator rod member (50) having a proximal rod end (58) and a distal rod end (60); said actuator rod being slidably supported by at least one rod support member (46); a rod helical spring member (54) disposed around said actuator rod member having one end thereof engaged to said least one rod support member and another end thereof engaged to a spring rest member (52) secured to said actuator rod to bias said actuator rod in a proximal direction; and a generally conical stopper member (62) secured to said distal rod end of said actuator rod member adapted to releasably sealably coupling said distal body opening of said valve body member; said stopper member disposed to be responsive to the actuator rod member.

3. An apparatus (10) for dispensing a quantity of liquid comprising an elongated container (12); a valve assembly (30) secured to a container proximal end (14) of said elongated container communicating with inside of same for gravitationally releasing a liquid (8) into a dispensing assembly; a dispensing assembly (80) engaged to said elongated container for receiving a liquid dispensed from said valve assembly and dispensing said liquid from said apparatus; a regulating means (110) engaged to said dispensing assembly for retaining said dispensing assembly to the elongated container while simultaneously protecting said valve assembly from hyper-compression; said elongated container comprising a generally hollow cylindrical wall member (18) having a first proximal end (14) and a first distal end (16) thereof; said first proximal end of said generally hollow cylindrical wall member comprising a generally circular top wall member (20) circumferentially secured to the generally cylindrical wall member; said first distal end defining a container opening (22); said elongated container defining a container cavity (28) therein; said dispensing assembly comprising a generally hollow tubular wall member (88) defining a second proximal end (90) and a second distal end (92) thereof; said second proximal end of said tubular wall member having a dispenser top wall (96) secured thereto; said second distal end defining a dispenser open end (94); said dispensing assembly defining a dispenser cavity (82) therein; a generally circular platform member (102) secured to said dispenser top wall (96) such that said platform member is generally coaxial and generally parallel with said dispenser top wall; and said dispenser top wall having at least one aperture (98) disposed therein; said valve assembly (30) comprises a third proximal end (42) and a third distal end (44) thereof; a generally hollow cylindrical housing (32) having a threaded outer surface (34) and a threaded inner surface (36); a valve body member (38) having a threaded exterior body face (40), a proximal body opening (66), and a distal body opening (68); said valve body member being threadably disposed within said generally hollow cylindrical housing; said valve body member further comprising an actuator rod member (50) having a proximal rod end (58) and a distal rod end (60); said actuator rod being slidably supported by at least one rod support member (46); a rod helical spring member (54) disposed around said actuator rod member having one end thereof engaged to said least one rod support member and another end thereof engaged to a spring rest member (52) secured to said actuator rod to bias said actuator rod in a proximal direction; and a generally conical stopper member (62) secured to said distal rod end of said actuator rod member adapted to releasably sealably coupling said distal body opening of said valve body member; said stopper member disposed to be responsive to the actuator rod member; a cap member (24) threadably secured to said elongated container for containing said liquid; said cap member comprising a threaded inner face (76) for threadably engaging said container and a washer member (26) for sealably coupling the cap member to the elongated container; and wherein said dispensing assembly additionally comprises an end cap assembly (104) releasably secured thereto; said end cap assembly comprising a fluid retaining means (100) for retaining liquid communicated thereto and transferring said liquid therefrom to an object; and said fluid retaining means comprising a cellulosic sponge member (108); and a pump member 136 disposed in said cap member for pressurizing said elongated container; and wherein said regulating means comprises a pair of annular sleeves (112,114) secured to said container proximal end of said container defining an annular channel (120) therebetween for receiving a screw member; a screw member (122) threadably disposed in said dispensing assembly for being received by said annular channel; said annular channel comprising a channel width wherein said screw member may longitudinally slide between said pair of annular sleeves within said channel.

* * * * *